United States Patent
Bittar et al.

(10) Patent No.: US 9,002,649 B2
(45) Date of Patent: Apr. 7, 2015

(54) EFFICIENT INVERSION SYSTEMS AND METHODS FOR DIRECTIONALLY-SENSITIVE RESISTIVITY LOGGING TOOLS

(75) Inventors: Michael S. Bittar, Houston, TX (US); Yumei Tang, Tomball, TX (US); Shanjun Li, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 268 days.

(21) Appl. No.: 13/695,455

(22) PCT Filed: Jul. 16, 2010

(86) PCT No.: PCT/US2010/042221
§ 371 (c)(1),
(2), (4) Date: Oct. 31, 2012

(87) PCT Pub. No.: WO2012/008965
PCT Pub. Date: Jan. 19, 2012

(65) Prior Publication Data
US 2013/0046474 A1    Feb. 21, 2013

(51) Int. Cl.
*G01V 1/28* (2006.01)
*G01V 3/10* (2006.01)
*G01V 3/28* (2006.01)

(52) U.S. Cl.
CPC .. *G01V 3/10* (2013.01); *G01V 3/28* (2013.01); *G01V 2210/626* (2013.01)

(58) Field of Classification Search
CPC ............................ G01V 3/10; G01V 2210/626
See application file for complete search history.

(56) References Cited

U.S. PATENT DOCUMENTS 4,965,522 A * 10/1990 Hazen et al. .................. 324/339
5,389,881 A    2/1995 Bittar et al.
(Continued)

FOREIGN PATENT DOCUMENTS

WO    WO-2008/115229    9/2008

OTHER PUBLICATIONS

Shearer, Peter M., Constraints on Inner Core Anisotropy from PKP(DF) Travel Times, Journal of Geophysical Research, vol. 99, No. B10, pp. 19,647-19,659, (Oct. 10, 1994).*

(Continued)

*Primary Examiner* — Janet Suglo
*Assistant Examiner* — Timothy H Hwang
(74) *Attorney, Agent, or Firm* — Krueger Iselin LLP; Benjamin Fite

(57) ABSTRACT

Various resistivity logging tools, systems, and methods are disclosed. At least some tool embodiments include transmit and receive antennas that measure the electromagnetic response of the formation, at least one of which is tilted to provide a directional sensitivity. A processor converts the response (measured as a function of the tool's rotation angle) into a set of inversion parameters, which are then used to estimate the anisotropic properties of the formation. The set of inversion parameters includes at least one parameter based on an antipodal sum of the response signal, and may further include parameters based on an antipodal difference and an average of the signal response. Antipodal sum and difference values at different rotational orientations can be included in the set of inversion parameters, and they may be normalized to reduce environmental effects. Some tool embodiments collect the relevant formation measurements using parallel or perpendicular tilted antennas.

23 Claims, 6 Drawing Sheets

(56) References Cited

U.S. PATENT DOCUMENTS

| | | | |
|---|---|---|---|
| 5,720,355 | A | 2/1998 | Lamine et al. |
| 6,163,155 | A | 12/2000 | Bittar |
| 6,191,586 | B1 | 2/2001 | Bittar |
| 6,218,842 | B1 | 4/2001 | Bittar |
| 6,353,321 | B1 | 3/2002 | Bittar |
| 6,359,438 | B1 | 3/2002 | Bittar |
| 6,476,609 | B1 | 11/2002 | Bittar |
| 6,538,447 | B2 | 3/2003 | Bittar |
| 6,810,331 | B2 | 10/2004 | Bittar et al. |
| 6,885,943 | B2 | 4/2005 | Bittar et al. |
| 6,911,824 | B2 | 6/2005 | Bittar |
| 6,998,844 | B2 * | 2/2006 | Omeragic et al. ............. 324/343 |
| 7,019,528 | B2 | 3/2006 | Bittar |
| 7,098,664 | B2 | 8/2006 | Bittar et al. |
| 7,098,858 | B2 | 8/2006 | Bittar et al. |
| 7,138,803 | B2 * | 11/2006 | Bittar ............................ 324/337 |
| 7,227,363 | B2 | 6/2007 | Gianzero et al. |
| 7,265,552 | B2 | 9/2007 | Bittar |
| 7,345,487 | B2 | 3/2008 | Bittar et al. |
| 7,350,568 | B2 | 4/2008 | Mandal et al. |
| 7,427,863 | B2 | 9/2008 | Bittar |
| 7,557,579 | B2 | 7/2009 | Bittar |
| 7,557,580 | B2 | 7/2009 | Bittar |
| 7,659,722 | B2 | 2/2010 | Bittar |
| 7,746,078 | B2 | 6/2010 | Bittar et al. |
| 7,839,346 | B2 | 11/2010 | Bittar et al. |
| 7,948,238 | B2 | 5/2011 | Bittar |
| 7,982,464 | B2 | 7/2011 | Bittar et al. |
| 8,030,937 | B2 | 10/2011 | Hu et al. |
| 8,085,049 | B2 | 12/2011 | Bittar et al. |
| 8,085,050 | B2 | 12/2011 | Bittar et al. |
| 8,174,265 | B2 | 5/2012 | Bittar et al. |
| 8,222,902 | B2 | 7/2012 | Bittar et al. |
| 8,264,228 | B2 | 9/2012 | Bittar et al. |
| 8,274,289 | B2 | 9/2012 | Bittar et al. |
| 8,291,975 | B2 | 10/2012 | Roddy et al. |
| 2002/0101242 | A1 | 8/2002 | Bittar |
| 2003/0051914 | A1 | 3/2003 | Bittar |
| 2003/0085707 | A1 | 5/2003 | Minerbo et al. |
| 2004/0019427 | A1 | 1/2004 | San Martin et al. |
| 2004/0027131 | A1 | 2/2004 | Bittar |
| 2004/0056816 | A1 | 3/2004 | Bittar et al. |
| 2004/0059513 | A1 | 3/2004 | Bittar et al. |
| 2004/0059514 | A1 | 3/2004 | Bittar et al. |
| 2005/0024060 | A1 | 2/2005 | Bittar |
| 2005/0030035 | A1 | 2/2005 | Beste et al. |
| 2005/0134280 | A1 | 6/2005 | Bittar et al. |
| 2006/0022887 | A1 | 2/2006 | Bittar |
| 2006/0033502 | A1 | 2/2006 | Bittar |
| 2006/0157277 | A1 | 7/2006 | Bittar et al. |
| 2006/0244455 | A1 | 11/2006 | Bittar |
| 2006/0255811 | A1 | 11/2006 | Bittar et al. |
| 2007/0075455 | A1 | 4/2007 | Marini et al. |
| 2007/0235225 | A1 | 10/2007 | Bittar |
| 2008/0078580 | A1 * | 4/2008 | Bittar ............................ 175/41 |
| 2008/0258733 | A1 | 10/2008 | Bittar |
| 2008/0278169 | A1 | 11/2008 | Bittar et al. |
| 2008/0315884 | A1 | 12/2008 | Bittar et al. |
| 2009/0015260 | A1 | 1/2009 | Bittar |
| 2009/0224764 | A1 | 9/2009 | Bittar |
| 2009/0230968 | A1 | 9/2009 | Bittar et al. |
| 2009/0302851 | A1 | 12/2009 | Bittar et al. |
| 2009/0309798 | A1 | 12/2009 | Bittar et al. |
| 2010/0117655 | A1 | 5/2010 | Bittar |
| 2010/0123462 | A1 | 5/2010 | Bittar |
| 2010/0127708 | A1 | 5/2010 | Bittar |
| 2010/0156424 | A1 | 6/2010 | Bittar et al. |
| 2010/0176812 | A1 | 7/2010 | Bittar et al. |
| 2010/0262370 | A1 | 10/2010 | Bittar et al. |
| 2011/0006773 | A1 | 1/2011 | Bittar |
| 2011/0175899 | A1 | 7/2011 | Bittar et al. |
| 2011/0180327 | A1 | 7/2011 | Bittar et al. |
| 2011/0186290 | A1 | 8/2011 | Roddy et al. |
| 2011/0187556 | A1 | 8/2011 | Roddy et al. |
| 2011/0192592 | A1 | 8/2011 | Roddy et al. |
| 2011/0199228 | A1 | 8/2011 | Roddy et al. |
| 2011/0221443 | A1 | 9/2011 | Bittar et al. |
| 2011/0234230 | A1 | 9/2011 | Bittar et al. |
| 2011/0251794 | A1 | 10/2011 | Bittar et al. |
| 2011/0298461 | A1 | 12/2011 | Bittar et al. |
| 2011/0308794 | A1 | 12/2011 | Bittar et al. |
| 2011/0308859 | A1 | 12/2011 | Bittar et al. |
| 2011/0309835 | A1 | 12/2011 | Barber et al. |
| 2011/0309836 | A1 | 12/2011 | Bittar et al. |
| 2012/0001637 | A1 | 1/2012 | Bittar et al. |
| 2012/0024600 | A1 | 2/2012 | Bittar et al. |
| 2012/0133367 | A1 | 5/2012 | Bittar et al. |
| 2012/0186873 | A1 | 7/2012 | Shayegi et al. |
| 2012/0199394 | A1 | 8/2012 | Bittar et al. |
| 2012/0234605 | A1 | 9/2012 | Donderici et al. |
| 2012/0249149 | A1 | 10/2012 | Bittar et al. |
| 2012/0283952 | A1 | 11/2012 | Tang et al. |
| 2012/0306500 | A1 | 12/2012 | Bittar et al. |

OTHER PUBLICATIONS

PCT International Search Report and Written Opinion, dated Sep. 23, 2010, Appl No. PCT/US2010/042221, "Efficient Inversion Systems and Methods for Directionally-Sensitive Resistivity Logging Tools", filed Jul. 16, 2010, 7 pgs.

PCT International Preliminary Report on Patentability, dated Jan. 31, 2013, Appl No. PCT/US2010/042221, "Efficient Inversion Systems and Methods for Directionally-Sensitive Resistivity Logging Tools", filed Jul. 16, 2010, 7 pgs.

AU First Exam Report, dated Feb. 15, 2013, Appl No. 2010357606, "Efficient Inversion Systems and Methods for Directionally-Sensitive Resistivity Logging Tools", filed Jul. 16, 2010, 3 pgs.

Shearer, Peter M. "Constraints on inner core anisotropy from PKP (DF) travel times", Journal of Geophysical Research, vol. 99, No. B10, pp. 19,647-19,659, Oct. 10, 1994, Retrieved from the Internet, <URL:http://www.mahi.ucsd.edu/shearer/PDF/40JGR94c.pdf>.

PCT International Search Report and Written Opinion, dated Sep. 23, 2010, Appl No. PCT/US10/42221, "Efficient Inversion Systems and Methods for Directionally-Sensitive Resistivity Logging Tools", filed Jul. 16, 2010, 10 pgs.

Shearer, Peter M. "Constraints on inner core anisotropy from PKP(DF) travel times", Journal of Geophysical Research, vol. 99, No. B10, pp. 19,647-19,659, Oct. 10, 1994 <URL:http://www.mahi.ucsd.edu/shearer/PDF/40JGR94c.pdf>, 13 pgs.

US Application, dated Jul. 16, 2012, U.S. Appl. No. 13/549,679, "Real-Time Casing Detection Using Tilted and Crossed Antenna Measurement", filed Jul. 16, 2012, 19 pgs.

AU Notice of Acceptance, dated Mar. 3, 2014, Appl No. 2010357606, "Efficient Inversion Systems and Methods for Directionally-Sensitive Resistivity Logging Tools", filed Jul. 16, 2010, 2 pgs.

AU Patent Examination Report No. 1, dated Feb. 15, 2013, Appl No. 2010357606, "Efficient Inversion Systems and Methods for Directionally-Sensitive Resistivity Logging Tools", filed Jul. 16, 2010, 3 pgs.

My Substantive Examination Adverse Report, dated Aug. 29, 2014, Appl. No. PI 20084097, "Robust Inversion Systems and Methods for Azimuthally Sensitive Resistivity Logging Tools," Filed Mar. 16, 2007, 2 pgs.

EP Supplemental Search Report, dated Oct. 7, 2014, Appl No. 10854830.6, "Efficient inversion systems and methods for directionally-sensitive resistivity logging tools," Filed Jul. 16, 2010, 8 pgs.

* cited by examiner

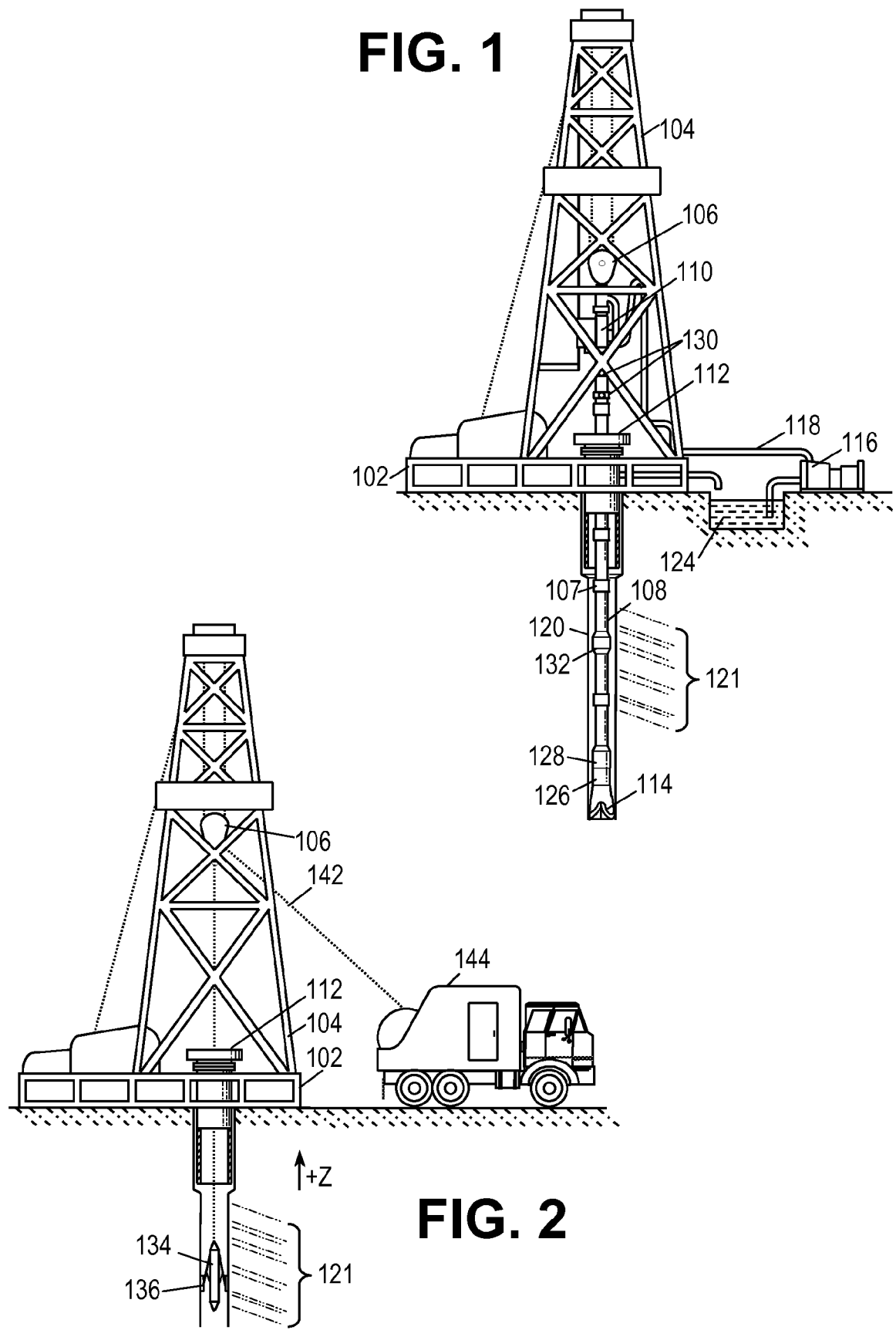

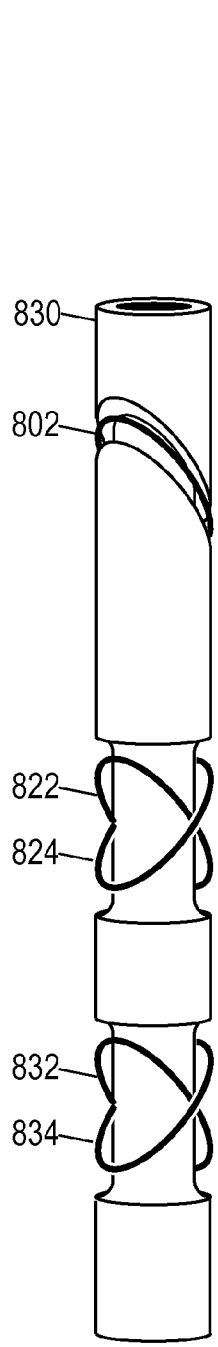
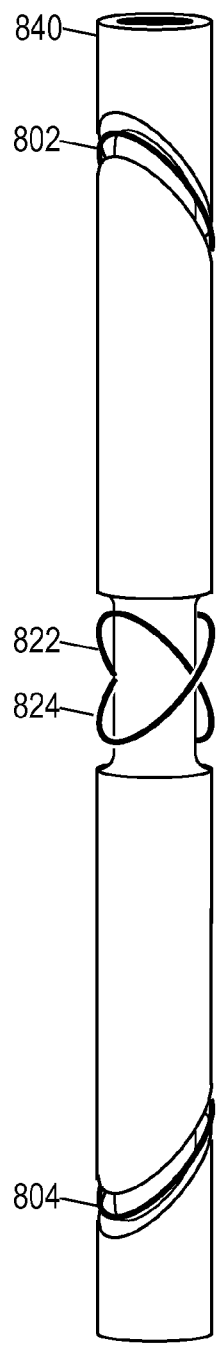
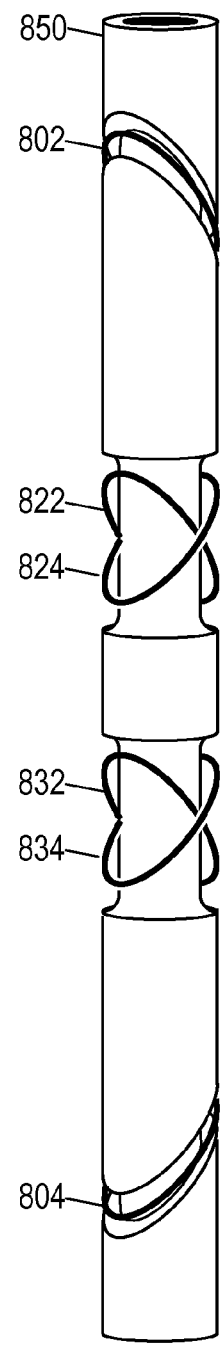
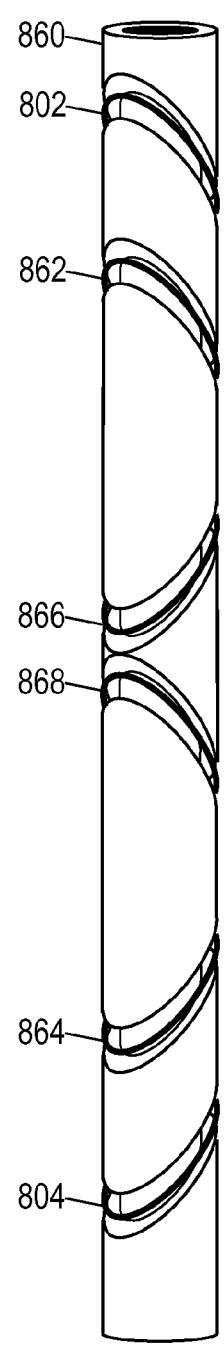
FIG. 8D  FIG. 8E  FIG. 8F  FIG. 8G

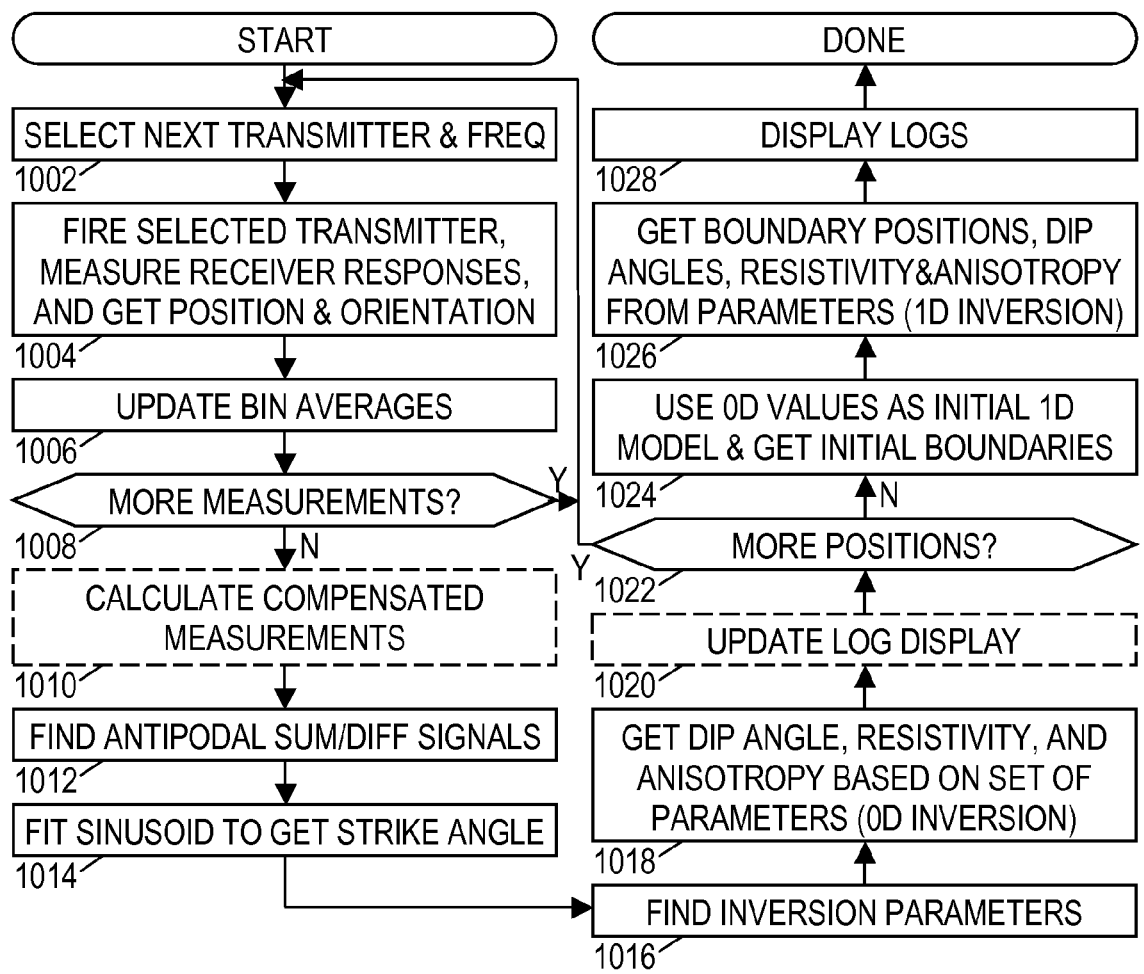

EFFICIENT INVERSION SYSTEMS AND METHODS FOR DIRECTIONALLY-SENSITIVE RESISTIVITY LOGGING TOOLS

CROSS-REFERENCE TO RELATED APPLICATIONS

The present application relates to application number PCT/US06/62149, titled "Antenna Coupling Component Measurement Tool Having a Rotating Antenna Configuration" and filed Dec. 15, 2006 by Michael Bittar and Guoyu Hu; and further relates to application number PCT/US07/64221, titled "Robust Inversion Systems and Methods for Azimuthally Sensitive Resistivity Logging Tools" and filed Mar. 16, 2007 by Michael Bittar and Guoyu Hu. Each of these references is hereby incorporated by reference.

BACKGROUND

In the field of petroleum well drilling and logging, resistivity logging tools are frequently used to provide an indication of the electrical resistivity of rock formations surrounding an earth borehole. Such information regarding resistivity is useful in ascertaining the presence or absence of hydrocarbons. A typical resistivity logging tool includes a transmitter antenna and a pair of receiver antennas located at different distances from the transmitter antenna along the axis of the tool. The transmitter antenna is used to create electromagnetic fields in the surrounding formation. In turn, the electromagnetic fields in the formation induce an electrical voltage in each receiver antenna. Due to geometric spreading and absorption by the surrounding earth formation, the induced voltages in the two receiving antennas have different phases and amplitudes. Experiments have shown that the phase difference ($\Phi$) and amplitude ratio (attenuation, A) of the induced voltages in the receiver antennas are indicative of the resistivity of the formation. The depth of investigation (as defined by a radial distance from the tool axis) to which such a resistivity measurement pertains is a function of the frequency of the transmitter and the distance from the transmitter to the mid-point between the two receivers. Thus, one may achieve multiple radial depths of investigation of resistivity either by providing multiple transmitters at different distances from the receiver pair or by operating a single transmitter at multiple frequencies.

Many formations are electrically anisotropic, a property which is generally attributable to extremely fine layering during the sedimentary build-up of the formation. Hence, in a formation coordinate system oriented such that the x-y plane is parallel to the formation layers and the z axis is perpendicular to the formation layers, resistivities $R_x$ and $R_y$ in directions x and y, respectively, are the same, but resistivity $R_z$ in the z direction is different from $R_x$ and $R_y$. Thus, the resistivity in a direction parallel to the plane of the formation (i.e., the x-y plane) is known as the horizontal resistivity, $R_h$, and the resistivity in the direction perpendicular to the plane of the formation (i.e., the z direction) is known as the vertical resistivity, $R_v$. The index of anisotropy, $\eta$, is defined as $\eta = [R_v/R_h]^{1/2}$.

The relative dip angle, $\theta$, is the angle between the tool axis and the normal to the plane of the formation. Resistive anisotropy and relative dip angle each have significant effects on resistivity logging tool measurements. As a result, resistivity logging systems should account for formation anisotropy and relative dip if accurate resistivity logs are to be obtained. In U.S. Pat. No. 6,163,155, Michael Bittar discloses one such approach that employs resistivity logging tools having tilted transmitter and/or receiver antennas. Bittar and Hu further disclose certain techniques for processing measurements from such tilted antenna logging tools in related application numbers PCT/US06/62149 and PCT/US07/64221. Improvements to these disclosed approaches have been developed and are presented herein.

BRIEF DESCRIPTION OF THE DRAWINGS

A better understanding of the invention can be obtained when the following detailed description of various disclosed embodiments, made by way of example only, is considered in conjunction with the attached drawings, in which:

FIG. 1 shows an illustrative logging while drilling environment including dipping formation beds;

FIG. 2 shows an illustrative wireline logging environment including dipping formation beds;

FIGS. 8A-8G show various illustrative antenna configurations for a resistivity logging tool;

FIG. 10 is a flow diagram of an illustrative resistivity logging method.

Figure 3:
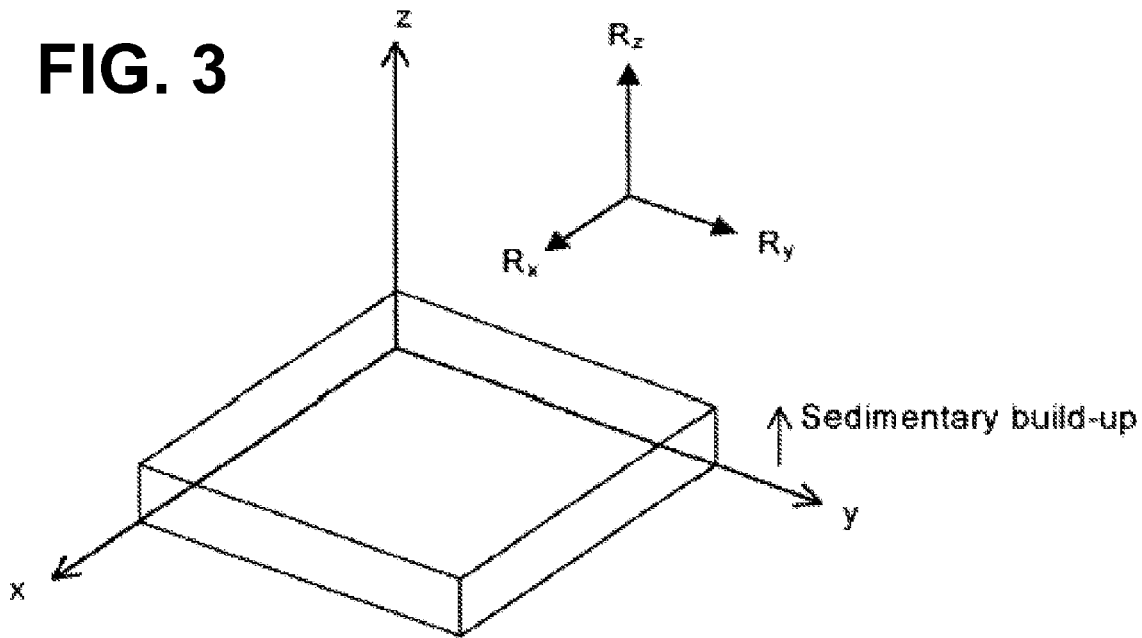
FIG. 3 is a schematic perspective view of a Cartesian coordinate system in a sedimentary earth formation.

While the invention is susceptible to various modifications and alternative forms, specific embodiments thereof are shown by way of example in the drawings and will herein be described in detail. It should be understood, however, that the drawings and detailed description thereof are not intended to limit the scope of the appended claims.

DETAILED DESCRIPTION

Accordingly various tools, systems, and methods are disclosed for resistivity logging. At least some of the tool embodiments include transmit and receive antennas that measure the electromagnetic response of the formation, at least one of which is tilted to provide a directional sensitivity. A processor converts the response (measured as a function of the tool's rotation angle) into a set of inversion parameters, which are then used to estimate the anisotropic properties of the formation. The set of inversion parameters includes at least one parameter based on an antipodal sum of the response signal, and may further include parameters based on an antipodal difference and an average of the signal response. Antipodal sum and difference values at different rotational orientations can be included in the set of inversion parameters, and they may be normalized to reduce environmental effects. Some tool embodiments collect the relevant formation measurements using parallel or perpendicular tilted antennas. The disclosed methods and systems offer an efficient way to determine the horizontal resistivity, vertical resistivity, relative dip angle and strike angle of anisotropic earth formations.

The disclosed tool configurations and operations are best understood in the context of the larger systems in which they operate. Accordingly, an illustrative logging while drilling (LWD) environment is shown in FIG. 1. A drilling platform 102 is equipped with a derrick 104 that supports a hoist 106 for raising and lowering a drill string 108. The hoist 106 suspends a top drive 110 that is used to rotate the drill string 108 and to lower the drill string through the well head 112. Sections of the drill string 108 are connected by threaded connectors 107. Connected to the lower end of the drill string 108 is a drill bit 114. As bit 114 rotates, it creates a borehole 120 that passes through various formations 121. A pump 116 circulates drilling fluid through a supply pipe 118 to top drive 110, downhole through the interior of drill string 108, through orifices in drill bit 114, back to the surface via the annulus around drill string 108, and into a retention pit 124. The drilling fluid transports cuttings from the borehole into the pit 124 and aids in maintaining the integrity of the borehole 120.

In wells employing acoustic telemetry for LWD, downhole sensors (including resistivity logging tool 126) are coupled to a telemetry module 128 including an acoustic telemetry transmitter that transmits telemetry signals in the form of acoustic vibrations in the tubing wall of drill string 108. An acoustic telemetry receiver array 130 may be coupled to tubing below the top drive 110 to receive transmitted telemetry signals. One or more repeater modules 132 may be optionally provided along the drill string to receive and retransmit the telemetry signals. Of course other telemetry techniques can be employed including mud pulse telemetry, electromagnetic telemetry, and wired drill pipe telemetry. Many telemetry techniques also offer the ability to transfer commands from the surface to the tool, thereby enabling adjustment of the tool's configuration and operating parameters. In some embodiments, the telemetry module 128 also or alternatively stores measurements for later retrieval when the tool returns to the surface.

An electromagnetic resistivity logging tool 126 is integrated into the bottom-hole assembly near the bit 114. The logging tool 126 may take the form of a drill collar, i.e., a thick-walled tubular that provides weight and rigidity to aid the drilling process. As the bit extends the borehole through the formations, logging tool 126 collects measurements relating to various formation properties as well as the tool orientation and position and various other drilling conditions.

The orientation measurements may be performed using an orientation indicator, which may include magnetometers, inclinometers, and/or accelerometers, though other sensor types such as gyroscopes may be used. Preferably, the tool includes a 3-axis fluxgate magnetometer and a 3-axis accelerometer. As is known in the art, the combination of those two sensor systems enables the measurement of the rotational ("toolface") angle, borehole inclination angle (aka "slope"), and compass direction ("azimuth"). In some embodiments, the toolface and borehole inclination angles are calculated from the accelerometer sensor output. The magnetometer sensor outputs are used to calculate the borehole azimuth. With the toolface, the borehole inclination, and the borehole azimuth information, various resistivity logging tools disclosed herein can be used to steer the bit to the desirable bed.

At various times during the drilling process, the drill string 108 is removed from the borehole as shown in FIG. 2. Once the drill string has been removed, logging operations can be conducted using a wireline logging tool 134, i.e., a sensing instrument sonde suspended by a cable 142 having conductors for transporting power to the tool and telemetry from the tool to the surface. A resistivity imaging portion of the logging tool 134 may have centralizing arms 136 that center the tool within the borehole as the tool is pulled uphole. A logging facility 144 collects measurements from the logging tool 134, and includes computing facilities for processing and storing the measurements gathered by the logging tool.

FIGS. 1 and 2 show formations 121 that are not perpendicular to the borehole, a situation that may occur naturally or may occur due to directional drilling operations. When measuring formation resistivity and orientation, it is convenient to use the formation coordinate system shown in FIG. 3. FIG. 3 shows a portion of a sedimentary formation bed, with the z-axis oriented perpendicular to the plane of the formation in the direction of the sedimentary accretion. As previously mentioned, the formation resistivity when measured along this axis is often different than formation resistivity measured in the x-y plane. In a dipping bed, the x-axis is chosen to be oriented in the direction of deepest descent, i.e., "downhill".

Figure 4:
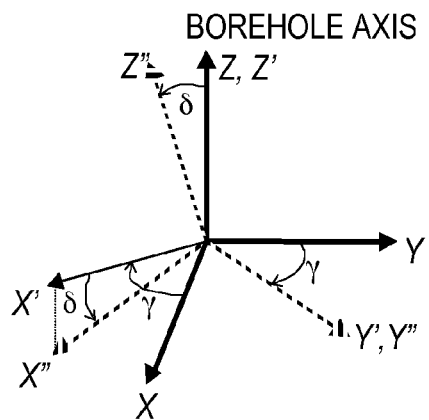
FIG. 4 shows a relationship between the coordinate systems of a borehole and a dipping formation bed.

The relationship between the formation coordinate system and the borehole coordinate system is shown in FIG. 4. The z-axis of the borehole coordinate system is aligned with the borehole's long axis, and the x-axis of the borehole coordinate system is directed to the north side (or alternatively, the high side) of the hole. As shown in FIG. 4, the two coordinate systems are related by two rotations. Beginning with the formation coordinate system (x,y,z), a first rotation of angle γ is made about the z axis. The resulting coordinate system is denoted (x', y', z'). Angle γ is the relative strike angle, which indicates the direction of the formation dip relative to the borehole's coordinate system. A second rotation of angle δ is then made about the y' axis. This aligns the formation coordinate system with the borehole coordinate system. Angle δ is the relative dip angle, which is the slope angle of the beds relative to the long axis of the borehole.

The vertical resistivity is generally found to be the resistivity as measured perpendicular to the plane of the formation, and the horizontal resistivity is the resistivity as measured within the plane of the formation. Determination of each of these parameters (dip angle, strike angle, vertical resistivity, and horizontal resistivity) is desirable, and can be accomplished using an electromagnetic resistivity logging tool having one or more tilted loop antennas.

Figure 5:
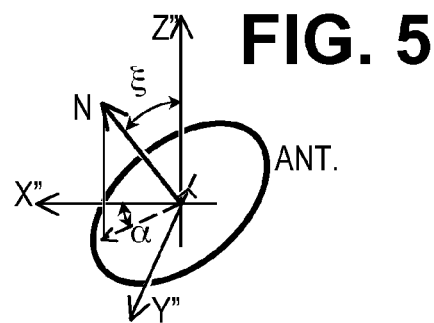
FIG. 5 shows a coordinate system for specifying the orientation of tilted loop antennas.

FIG. 5 shows a coordinate system for specifying the orientation of a loop antenna. The tool coordinate system (x", y", z") has a z" axis oriented parallel to the long axis of the logging tool. The x" axis is directed to the "tool face scribe line" that is used to specify the tool orientation. In the tool coordinate system, the orientation of the loop antenna is represented by a normal vector N that is perpendicular to the plane of the loop antenna windings. The tilt angle of the antenna is the angle ξ between the z" axis and the normal vector N. The rotational orientation α of the loop antenna is the angle α between the x" axis and the projection of the normal vector N in the x"-y" plane. (The illustrative tools shown in the figures all have ξ=±45° and α=0, though this is by no means a requirement.)

Figure 6:
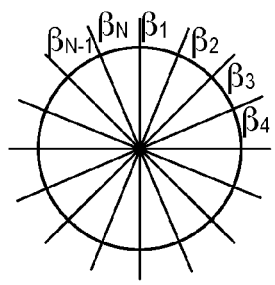
FIG. 6 shows an illustrative division of a borehole circumference into rotational angle bins.

To enable simultaneous measurement of resistivity, anisotropy, and dip, the disclosed logging tools and methods employ one or more tilted antennas to obtain directionally-sensitive resistivity measurements. The circumference of the borehole is divided into angular sectors as shown in FIG. 6, and as the tool rotates and the tool face scribe line passes through each azimuthal bin, the set of resistivity measurements collected at that orientation is associated with that bin at that position in the borehole. In various contemplated embodiments, the number of bins ranges as low as 6 or 8 bins, and as high as 128 bins, with 32 being a particularly suitable number of bins. Depending on the relative rotational and axial traversal rates, multiple measurement sets may be obtained within each bin and combined (e.g., by averaging). The tool, or the system in which it is incorporated, may include a rotational angle sensor to determine the rotational angle of the tool (and the antenna) about the tool axis.

Figure 7:
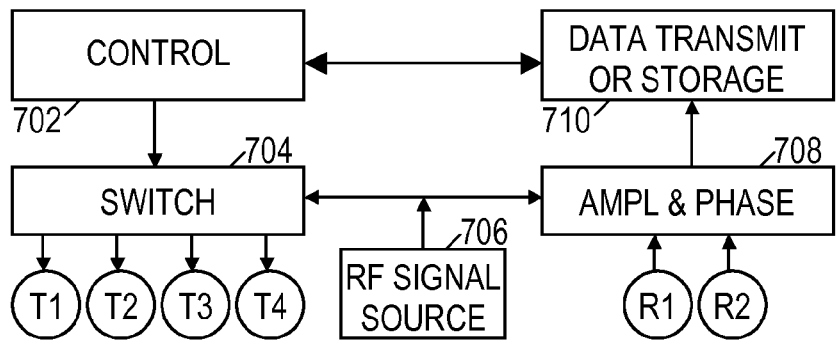
FIG. 7 shows a block diagram of the circuitry used in accordance with the present invention.

FIG. 7 is a block diagram of an illustrative tool for collecting directionally-sensitive resistivity measurements. A control module 702 governs the operation of the tool, and it may take the form of a processor, microcontroller, field programmable gate array, or application-specific integrated circuit. Module 702 controls a set of switches 704 to pass a signal from signal source 706 to a selected one of the transmit antennas T1-T4. An amplitude and phase detection module 708 measures the induced signals in each of the receiver antennas R1-R2. The control module 702 further causes a storage/communication module 710 to sample and digitize the amplitude and phase measurements and store them or communicate them to another module for storage and/or processing as described herein below. The number of transmitters and receivers can be varied as desired to provide various combinations of transmitter/receiver pairs having different spacings and midpoints. The signal frequency can also be varied to provide different depths of investigation, and the contemplated frequencies fall in the range from 10 Hz to $10^7$ Hz.

FIGS. 8A-8G show various illustrative antenna configurations for a resistivity logging tool. Resistivity logging tool 800 (FIG. 8A) has two tilted transmit antennas 802, 804 and two tilted receive antennas 806, 808, thereby providing four transmit-receive antenna pairings. The attenuation and phase measurements of receive antennas 806, 808 in response to transmit antenna 802 are respectively labeled $A_1$, $\Phi_1$ and $A_2$, $\Phi_2$. The attenuation and phase measurements of receive antennas 806, 808 in response to the other transmit antenna 804 are respectively labeled $A_4$, $\Phi_4$ and $A_3$, $\Phi_3$. In certain alternative embodiments, the tool measures in-phase and quadrature-phase components of the receive signals rather than measuring amplitude and phase. In either case, these measurements are collected and stored as a function of the tool's position and rotational orientation in the borehole.

The illustrated tool has the receive antennas positioned between the transmit antennas with transmit antenna 804 oriented parallel to the receive antennas 806, 808, and has transmit antenna 802 oriented perpendicular to the receive antennas. In the illustrated example, each of the antennas share a common rotational orientation, with transmit antenna 802 being tilted at −45° and the other antennas being tilted at +45° relative to the longitudinal tool axis. In the illustrative tool embodiments, each of the coil antennas surrounding the tool is mounted in a recess and protected by a non-conductive filler material and/or a shield having non-conducting apertures. The tool body is primarily composed of steel. The relative tool dimensions and antenna spacings are subject to a great deal of variation depending on the desired tool properties. The distance between the receive coils may be on the order of 0.1 m, while the spacing of the transmit coils to the midpoint between the receivers may vary from about 0.4 m to over 10 m.

Figure 8A:
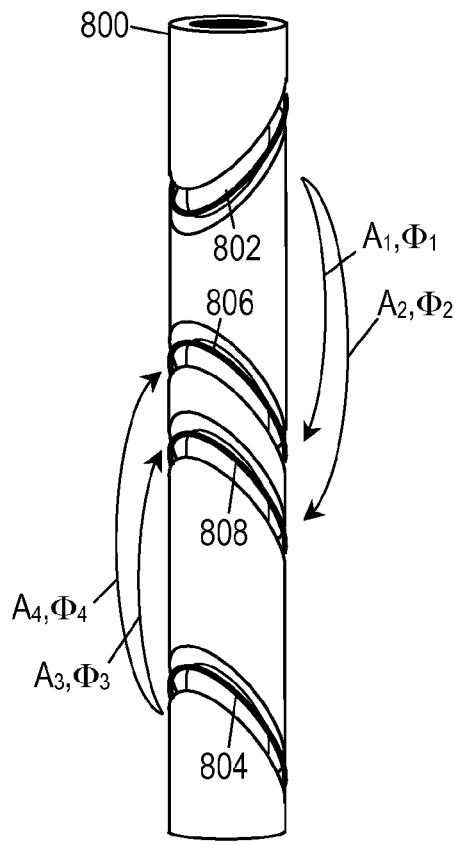
Figure 8B:
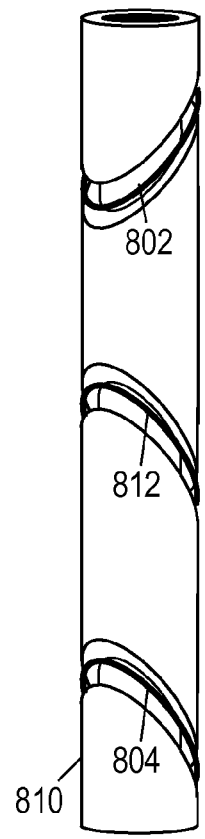
Figure 8C:
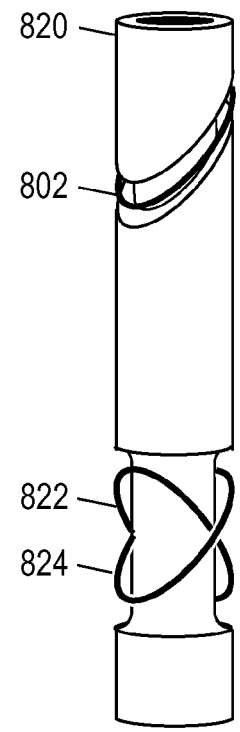

FIG. 8B shows a resistivity logging tool 810 much like tool 800, but having only one tilted receive antenna 812 rather than two. One of the transmit antennas is parallel to the receiver while the other is perpendicular to it. FIG. 8C shows an illustrative resistivity logging tool 820 having one transmit antenna 802 and a pair of crossed receive antennas 822, 824. The transmit antenna is parallel to one of the receive antennas and perpendicular to the other. FIG. 8D shows a similar tool 830 having a second pair of crossed receive antennas 832, 834 in addition to the first pair 822, 824. FIGS. 8E and 8F show tools 840, 850, which correspond to tools 820, 830, but each include a second transmit antenna 804 on the opposite side of the receive antennas from the first transmit antenna 802. FIG. 8G shows an illustrative tool in which the crossed receive antennas 866, 868 have been separated to eliminate the overlap, and two more transmit antennas 862, 864 have been added. The symmetric positioning of transmitters and receivers in the tool embodiments shown in FIGS. 8E-8G enable the measurements in response to the opposed transmitters to be combined in a manner that compensates for parameter variations in the tool's measurement electronics. Such compensated measurement techniques are known in the art and can be preferred to the use of uncompensated measurements.

Each of the foregoing illustrative tool configurations offer azimuthally-sensitive measurements that enable formation resistivity, anisotropy, dip and strike to be determined. The tool measurements are associated with rotational angle bins as shown in FIG. 6. For N bins, the rotational angles can be specified as:

$$\beta_k = (k-1)2\pi/N \text{ for } k=1, \ldots, N \quad (1)$$

The in-phase and quadrature components of the receive signals exhibit an approximately sinusoidal dependence on the tool's rotational angle. The measurements of a given receive antenna r in response to a given transmit antenna t in rotational angle bin k are represented by $V_{rt}(k)$, which is a complex valued number whose real part represents the component of the receive signal in-phase with the transmitted signal, and whose imaginary part represents the component of the receive signal in quadrature with the transmitted signal. (Though the following description assumes for explanatory purposes that $V_{rt}(k)$ are uncompensated measurements, compensated measurements can also be used.)

Figure 9A:
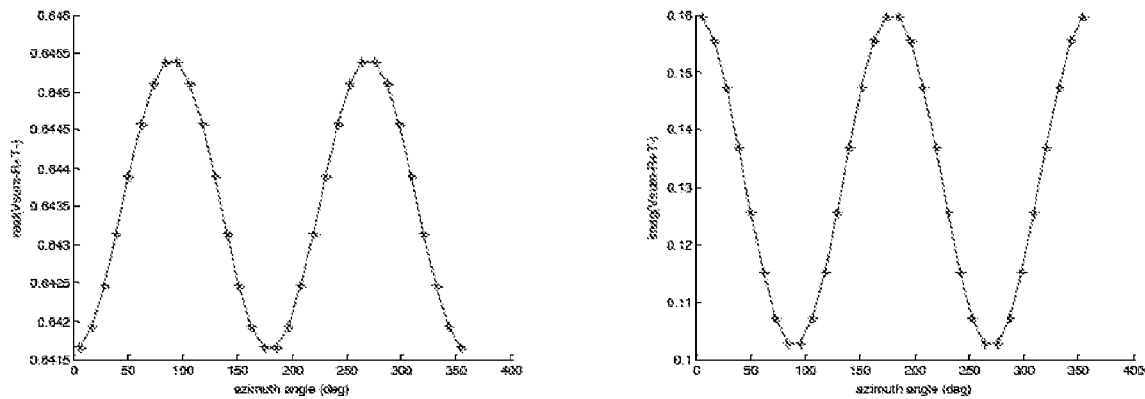
FIG. 9A is a graph of an illustrative antipodal sum signal.
Figure 9B:
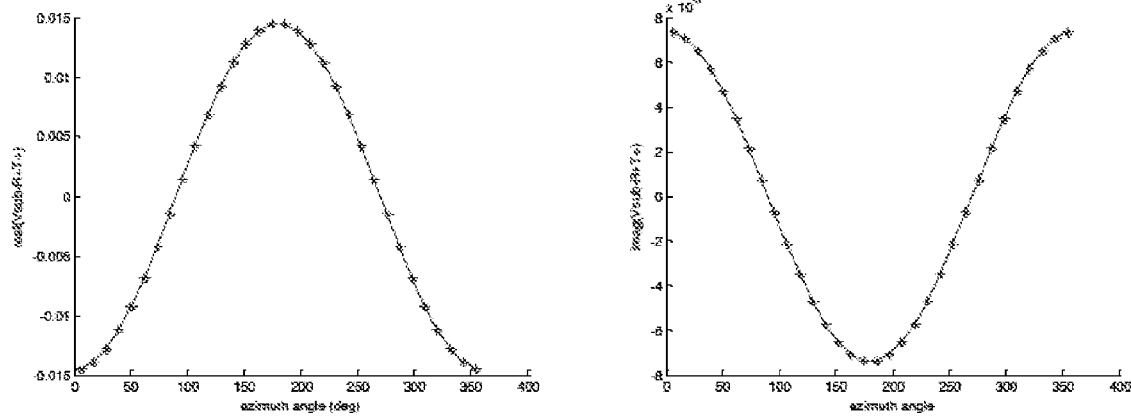
FIG. 9B is a graph of an illustrative antipodal difference signal.

From a given receiver signal, we can construct the following useful curves:

$$S_{rt}(k) = V_{rt}(k) + V_{rt}([(k-1)+N/2]_M+1) \text{ for } k=1, \ldots, N \quad (2)$$

$$D_{rt}(k) = V_{rt}(k) - V_{rt}([(k-1)+N/2]_M+1) \text{ for } k=1, \ldots, N \quad (3)$$

where $[\cdot]_N$ represents a modulo N operation. $S_{rt}(k)$ thus represents the sum of measurements at opposite rotational angles ("antipodal sum"), and $D_{rt}(k)$ represents the difference of measurements at opposite rotational angles ("antipodal difference"). FIG. 9A shows the real and imaginary parts of the antipodal sum for a simulated homogenous formation having horizontal resistivity Rh=1 Ωm, vertical resistivity Rv=2 Ωm, and a dip angle of 75°. FIG. 9B shows the real and imaginary parts of the antipodal difference. Note that these curves can be fit to the equations:

$$S_{rt}(k) = A_1 \cos(2\beta_k + 2\beta_0) + A_2 \quad (4)$$

$$D_{rt}(k) = A_3 \cos(\beta_k + \beta_0) \quad (5)$$

where $\beta_0$ is the angle at which the magnitude of the antipodal difference is maximized. (For FIGS. 9A and 9B, $\beta_0 = 180°$.) The coefficients $A_1, A_2, A_3$ are complex valued and are found by curve fitting. As an alternative to determining the coefficients, inversion can be based on the values of the antipodal sum and difference signals in the bins corresponding to $\beta_0$ and $\beta_0 + 90°$ (which, pursuant to equations 2 and 3, also specifies the values for these signals in the bins corresponding to $\beta_0 + 180°$ and $\beta_0 + 270°$).

It has been found that the signal average is also useful for inversion:

$$\overline{V}_{rt} = 1/N \sum_{k+1}^{N} V_{rt}(k) \quad (6)$$

When performing inversion, the systems and methods disclosed herein represent the tool measurements as some function of the antipodal sum signal derived from one or more receive antennas in response to one or more transmit antennas. Preferably, the inversion is also based on an antipodal difference signal and a signal average. To reduce environmental effects and measurement noise, each of the antipodal sum, antipodal difference, and signal average values may be normalized in some fashion. In one example, the inversion parameters X1, X2, and X3 are defined as follows:

$$X1 = \frac{S_{R1,T+}(\beta_0)}{S_{R2,T+}(\beta_0)} \quad (7)$$

$$X2 = \frac{D_{R1,T+}(\beta_0)}{D_{R2,T+}(\beta_0)} \quad (8)$$

$$X3 = \frac{\overline{V}_{R1,T+}}{\overline{V}_{R2,T+}} \quad (9)$$

where transmitter t=T+ is the transmit antenna oriented perpendicular to the receive antennas r=R1 and r=R2 (e.g., in FIG. 8A, transmit antenna 802 and receive antennas 806, 808). Thus the inversion parameters are ratios between corresponding values for the two receive antennas in response to a given antenna. The given antenna can be either parallel or perpendicular and need not be the same for each of the parameters. For example, in an alternative embodiment, X1 is defined as:

$$X1 = \frac{S_{R1,T=}(\beta_0)}{S_{R2,T=}(\beta_0)} \quad (10)$$

where transmitter t=T_ is the transmit antenna oriented parallel to the receive antennas r=R1 and r=R2 (e.g., in FIG. 8A, transmit antenna 804 and receive antennas 806, 808). X2 can similarly be based on measurements in response to a parallel transmit-receive antenna pair. X1 and X2 can alternatively be normalized by the relevant signal average:

$$X1 = \frac{S_{R1,T+}(\beta_0)}{\overline{V}_{R1,T+}} \quad (11)$$

$$X2 = \frac{D_{R1,T+}(\beta_0)}{\overline{V}_{R1,T+}} \quad (12)$$

Although $\beta_0$ is used for both X1 and X2, this is not a requirement. In an alternative embodiment, X1 is defined as the ratio of antipodal sum values at $\beta_0+90°$.

Initial tests suggest that normalization by the signal average is preferable, and that it is preferable to define X1 and X2 using the same transmit-receive antenna pair. The use of a transmit antenna perpendicular to the receive antenna seems to minimize environmental effects from the borehole and drillstring. Though of course the antipodal difference parameter (X2) is helpful, it appears that a successful inversion of the formation parameters does not require it.

Inversion can be performed on a point-by-point basis during the logging of the borehole. Such a "zero-dimension" or "0D" inversion takes into account only the tool measurements at a given position and ignores the possibility that formation properties might vary along the length of the borehole. Though such inversion tends to be very fast, it is unable to deal with shoulder effects from formation layer boundaries. To deal with such effects, "one-dimension" or "1D" inversion takes into account the tool measurements along a stretch of the borehole and finds a layered formation model that matches those measurements. A significant step in 1D inversion is determining the locations of boundaries between formation layers. If the antipodal difference signals for a parallel transmit-receive antenna pair and a perpendicular transmit-receive antenna pair are plotted as a function of tool position, both signals display spikes or "horns" at the boundary locations. However, since the perpendicular pair signal is essentially zero in a homogeneous formation, the spikes provide a simpler, more accurate initial estimate of the number of boundaries and their locations. Where the tool includes multiple perpendicular transmit-receive antenna pairs, the pair with the shortest spacing may be preferred for higher resolution.

FIG. 10 shows an illustrative resistivity logging process to determine horizontal resistivity, vertical resistivity, and relative dip and strike angles as a function of position along the borehole. After the resistivity logging tool has been placed in a borehole and drilling commences, with accompanying rotation of the logging tool, the logging process begins in block 1002 with the selection of a transmitter antenna and a transmit frequency. As the process continues, the selection operation iterates through each transmit antenna and each transmit frequency that is suitable for that transmit antenna.

In block 1004, the logging tool drives the selected transmit antenna at the selected frequency, and measures the receiver responses. The logging tool further measures the tool position and orientation to be associated with the measured receiver responses. In various embodiments, the receiver responses may be absolute phase shift, absolute attenuation, differential phase shift, differential attenuation, and/or complex voltage. (Some tool embodiments will employ in-phase and quadrature phase signal measurements in place of amplitude and phase.) In block 1006, the position and orientation information is used to associate the measured receiver responses with an azimuthal bin. If multiple measurements are obtained for a given bin, the measurements may be combined, e.g., by averaging. In block 1008, a test is made to determine if there are more measurements to be made at this position in the borehole (e.g., a test to see if the measured tool position is still within a predetermined range). If so, blocks 1002-1008 are repeated.

In optional block 1010, the logging tool determines compensated measurements by combining measurements in response to transmit antennas oppositely situated with respect to the receive antenna(s). In block 1012, the logging tool or some other portion of the logging system determines a set of antipodal sum and/or antipodal difference values. Based on these values, the tool or system determines the formation strike angle in block 1014, e.g., by fitting a sinusoidal curve to the data. In block 1016, the system calculates the inversion parameters which include at least one parameter based on one or more antipodal sum values. In at least some embodiments, the inversion parameters include the normalized antipodal sum value at strike angle $\beta_0$, the normalized antipodal difference value at strike angle $\beta_0$, and a normalized average signal value.

In block 1018, the system uses the inversion parameters to perform a 0D inversion to find a formation dip angle, and the anisotropic formation resistivities. This information can be used in block 1020 to update a real-time display of the formation properties log. In block 1022, the system determines if logging should continue (e.g., whether the drilling process is continuing), and if so, the process returns to block 1002 to obtain those measurements. Otherwise, the process enters block 1024 where the system determines an initial formation model from the 0D inversion results, employing bed boundary locations as estimated from, e.g., horn locations in a plot of the un-normalized antipodal difference values. Beginning with the initial model, the system performs a 1D inversion in block 1026 to obtain an improved estimate of formation properties as a function of position. The system displays the resulting formation logs in block 1028.

The 0D inversion process can take the form of a look-up table-based search with interpolation, but is preferably performed with a closed-form forward model of the tool responses that are expected in response to estimates of the formation dip, resistivity, and anisotropy. Beginning with random, arbitrary, or in some cases, predetermined, estimates of the formation dip, resistivity, and anisotropy, the inversion process repeatedly updates these estimates until the sinusoidal parameter values predicted by the forward model match the measured sinusoidal parameter values to within some predetermined threshold. The update routine may, for example, employ the Levenberg-Marquardt method discussed by Tianfei Zhu and Larry D. Brown, "Two-dimensional Velocity Inversion and Synthetic Seismogram Computation," Geophysics, vol. 52, no. 1, January 1987, p. 37-50.

Though certain embodiments described above employ only a few inversion parameters, we recognize that a greater number of parameters can offer a better inversion result. For example, some systems perform the inversion based on the antipodal sum and difference values at four points around the circumference (e.g., bin numbers N/4, N/2, 3N/4, and N), as calculated from multiple receivers in response to differently-spaced transmitters and in response to different signal frequencies.

Some system embodiments store and communicate to the surface the full receiver responses $V_{rt}(k)$ as a function of rotational angle and position. Other embodiments condense the response information into a few representative parameters, e.g., the mean value, the peak-to-peak amplitude, and the strike angle, thereby reducing the required bandwidth or space for communicating and/or storing the measurement data.

Although the foregoing specific details describe certain preferred system and method embodiments, persons reasonably skilled in the art of petroleum well drilling and logging will recognize that various changes may be made in the details of the disclosed methods and systems without departing from the scope of the appended claims. As one example, the principle of reciprocity can be used to obtain the same tool measurements while reversing the roles of transmit and receive antennas in any given tool. As another example, the illustration of land-based drilling operations provided in FIGS. 1 and 2 is in no way limiting, as it is clear that the logging systems and methods described herein can be used with corresponding effect in offshore drilling and logging operations.

What is claimed is:

1. A system comprising:
   a logging tool having a tool axis, the tool comprising:
   at least one transmit antenna to transmit an electromagnetic wave into a formation; and
   at least one receive antenna to receive an electromagnetic wave from the formation, wherein at least one of the transmit and receive antennas is tilted with respect to the tool axis;
   the system further comprising at least one processor coupled to the at least one receive antenna to convert the receive antenna's response, as a function of a rotational angle of the tool about its axis, into at least one antipodal sum value for a given position of the tool in a borehole in the formation,
   wherein the at least one processor serves to determine one or more anisotropic formation parameters based at least in part on said at least one antipodal sum value.

2. The system of claim 1, wherein the processor is coupled to a user interface to display at least one of said anisotropic formation parameters.

3. The system of claim 1, wherein the at least one processor further serves to determine at least one antipodal difference value for the given position in the borehole, and to determine one or more of said anisotropic formation parameters based at least in part on said antipodal difference value.

4. The system of claim 3, wherein the at least one processor serves to normalize said antipodal sum and antipodal difference values with corresponding antipodal sum and antipodal difference values from a response measured by a second receive antenna.

5. The system of claim 3, wherein the at least one processor serves to normalize said antipodal sum and antipodal difference values with an average signal value.

6. The system of claim 3, wherein said antipodal sum and difference values are associated with an estimated formation strike angle.

7. The system of claim 3, wherein the at least one processor determines said anisotropic formation parameters from antipodal sum and difference values at multiple rotational angles.

8. The system of claim 1, wherein the anisotropic formation parameters include a dip angle, a horizontal resistivity, and a vertical resistivity.

9. The system of claim 1, wherein as part of converting the receive antenna's response into an antipodal sum value, said at least one processor determines a compensated response from measurements in response to multiple transmitted electromagnetic waves.

10. A logging method that comprises:
    sending an electromagnetic wave from a transmit antenna into a formation;
    receiving an electromagnetic wave from the formation with a receive antenna, wherein at least one of the transmit and receive antennas is tilted with respect to a tool axis;
    determining variation with respect to tool rotation angle of at least one formation measurement based at least in part on the received electromagnetic wave;
    determining a set of inversion parameters including at least one parameter based at least in part on an antipodal sum of said at least one formation measurement; and
    estimating anisotropic formation parameters based on the set of inversion parameters.

11. The method of claim 10, further comprising displaying the anisotropic formation parameters as a log.

12. The method of claim 10, wherein the anisotropic formation parameters include a dip angle, a horizontal resistivity, and a vertical resistivity.

13. The method of claim 10, wherein the formation measurement is a complex value representing in-phase and quadrature components of a receive antenna response.

14. The method of claim 10, wherein the set of inversion parameters includes at least one parameter based at least in part on an antipodal sum of a formation measurement taken at a different frequency than the first formation measurement.

15. The method of claim 10, wherein the set of inversion parameters includes at least one parameter based at least in part on an antipodal sum of a formation measurement obtained via a second receive antenna.

16. The method of claim 10, wherein the set of inversion parameters includes at least one parameter based at least in part on an antipodal difference of the at least one formation measurement.

17. The method of claim 16, wherein the set of inversion parameters includes at least one parameter based at least in part on the formation measurement averaged with respect to tool rotation angle.

18. The method of claim 10, wherein the set of inversion parameters includes parameters based at least in part on antipodal sums of the formation measurements at different rotation angles.

19. The method of claim 10, wherein the antipodal sum parameter is normalized by a corresponding value obtained using a second, or the second, receive antenna.

20. The method of claim 10, wherein the antipodal sum parameter is normalized by an average signal value.

21. The method of claim 10, wherein the transmit antenna is parallel to the receive antenna.

22. The method of claim 10, wherein the transmit antenna is perpendicular to the receive antenna.

23. The method of claim 10, wherein the formation measurement is a compensated formation measurement.

* * * * *